United States Patent
Hammendorp et al.

(10) Patent No.: US 9,413,960 B2
(45) Date of Patent: Aug. 9, 2016

(54) METHOD AND APPARATUS FOR CAPTURING VIDEO IMAGES INCLUDING A START FRAME

(71) Applicant: HERE Global B.V., LB Veldhoven (NL)

(72) Inventors: Maarten Hammendorp, Palo Alto, CA (US); Stephen Hartford, San Jose, CA (US); Pascal Wever, Los Angeles, CA (US); Andrew Gartrell, Woodland Hills, CA (US)

(73) Assignee: HERE Global B.V, Veldhoven (NL)

( * ) Notice: Subject to any disclaimer, the term of this patent is extended or adjusted under 35 U.S.C. 154(b) by 148 days.

(21) Appl. No.: 14/201,730

(22) Filed: Mar. 7, 2014

(65) Prior Publication Data

US 2015/0256750 A1    Sep. 10, 2015

(51) Int. Cl.
*H04N 5/232* (2006.01)
*H04N 5/77* (2006.01)
*H04N 5/76* (2006.01)

(52) U.S. Cl.
CPC ........... *H04N 5/23245* (2013.01); *H04N 5/232* (2013.01); *H04N 5/76* (2013.01); *H04N 5/772* (2013.01)

(58) Field of Classification Search
CPC ... H04N 5/23245; H04N 5/232; H04N 5/772; H04N 5/23293; H04N 5/23216; H04N 5/76
See application file for complete search history.

(56) References Cited

U.S. PATENT DOCUMENTS

| | | | |
|---|---|---|---|
| 7,639,922 B2 * | 12/2009 | Saitoh | G11B 27/034 386/291 |
| 8,730,339 B2 * | 5/2014 | Sato | H04N 5/772 348/220.1 |
| 2003/0189647 A1 | 10/2003 | Kang | |
| 2007/0081796 A1 | 4/2007 | Fredlund et al. | |

(Continued)

FOREIGN PATENT DOCUMENTS

| EP | 2627074 A1 | 8/2013 |
|---|---|---|
| WO | 2009/150292 A1 | 12/2009 |

(Continued)

OTHER PUBLICATIONS

International Search Report and Written Opinion received for corresponding Patent Cooperation Treaty Application No. PCT/EP2015/054136, dated May 29, 2015, 13 pages.

(Continued)

*Primary Examiner* — Luong T Nguyen
(74) *Attorney, Agent, or Firm* — Lempia Summerfield Katz LLC

(57) ABSTRACT

A method, apparatus and computer program product are provided so as to capture video images such that an image of a moment of significance is captured within the video. In the context of a method, an indication is received that a video capture user input will be subsequently provided directing that video images be captured. The method then determines whether a pre-roll is to be captured in advance of the video capture user input. The method causes the video images to be captured in response to the video capture user input. The video images include a start frame captured temporarily proximate receipt of the video capture user input. The method receives a video capture completion user input indicating that the capturing of the video images should be ceased. In response to receipt of the video capture completion user input, the method causes a post-roll to be captured.

20 Claims, 6 Drawing Sheets

(56) References Cited

U.S. PATENT DOCUMENTS

| | | |
|---|---|---|
| 2008/0129854 A1 | 6/2008 | Onoda et al. |
| 2010/0225784 A1* | 9/2010 | Sato ............... H04N 5/772 348/231.99 |
| 2012/0242853 A1 | 9/2012 | Jasinski et al. |
| 2013/0208143 A1* | 8/2013 | Chou ............... H04N 1/212 348/231.99 |
| 2013/0222670 A1* | 8/2013 | Lin ............... H04N 5/23293 348/333.11 |
| 2014/0354850 A1* | 12/2014 | Kosaka ............ H04N 5/23216 348/231.5 |

FOREIGN PATENT DOCUMENTS

| | | |
|---|---|---|
| WO | 2012/138620 A2 | 10/2012 |
| WO | 2013/100924 A1 | 7/2013 |
| WO | 2014/031834 A1 | 2/2014 |

OTHER PUBLICATIONS

"Illustrated Guide to Using Instagram Video", Forbes, Retrieved on Mar. 10, 2014, Webpage available at : http://www.forbes.com/sites/larrymagid/2013/06/21/illustrated-guide-to-using-instagram-video/.

* cited by examiner

METHOD AND APPARATUS FOR CAPTURING VIDEO IMAGES INCLUDING A START FRAME

TECHNOLOGICAL FIELD

An example embodiment of the present invention relates generally to capturing video images and, more particularly, to capturing video images including a start frame.

BACKGROUND

A variety of devices are configured to capture images, such as still images, video images or the like. For example, a camera may capture still images, while video recorders may capture video images. In addition, some image capture devices, such as smartphones, may alternatively capture both still images and video images depending upon its mode of operation.

In an instance in which a video is to be recorded, one moment within the extended period of time during which the video images are captured may be of particular importance. In this instance, it is desirable to capture an image of the particular moment. While a still image of the particular moment may be captured, it may be burdensome to operate both a camera for capturing the still image and video recorder for capturing the video images. Moreover, if the user utilizes a single device that is capable of capturing both still images and video images, it may still be burdensome to switch between the different modes of operation, such as between a mode in which a still image is captured and a mode in which video images are captured.

Additionally, while the video of the events that occur during a period of time that include the moment of interest may be captured so as to provide context for the moment, the video will not necessarily include an image of the particular moment. Indeed, the frame rate at which video images are captured space the individual frames of a video apart by a predefined period of time, such as by spacing the frames of a video apart by 0.1 seconds for a frame rate of 10 frames per second. Thus, a video will be more likely to have missed the particular moment of import than to have captured an image of the particular moment.

BRIEF SUMMARY

A method, apparatus and computer program product are provided in accordance with an example embodiment in order to capture video images in such a manner that an image of a moment of particular significance is captured within the video. As such, a method, apparatus and computer program product of an example embodiment both capture video images as well as an image of a particular moment with a single device in an intuitive manner. Thus, a user need not be burdened with multiple devices to separately capture still images and video images, and also need not be concerned with switching modes of operation, such as between a mode in which a still image is captured and a mode in which video images are captured, but may still capture video images in such a manner that a respective image of the video will coincide with the moment of particular significance.

In an example embodiment, a method is provided that includes receiving an indication that a video capture user input will be provided directing that video images be captured. The indication is received in advance of the video capture user input. The method of this embodiment also includes determining, with a processor, whether a pre-roll comprising one or more video frames is to be captured in advance of the video capture user input in response to receiving the indication. The method of this embodiment also includes causing the video images to be captured in response to the video capture user input. The video images include a start frame captured temporarily proximate receipt of the video capture user input. In this embodiment, the method also includes receiving a video capture completion user input indicating that the capturing of the video images should be ceased. In response to receipt of the video capture completion user input, the method of this embodiment also includes causing a post-roll comprising a plurality of video frames to be captured following capture of the video images.

The method of an example embodiment may cause the video images to be captured by causing the start frame to be captured instantaneously with or near instantaneously with receipt of the video capture user input. The method of an example embodiment may determine whether a pre-roll is to be captured by causing the pre-roll to be captured only in an instance in which the frame rate is at least as great as a predefined minimum threshold. In this embodiment, the method may also including appending the pre-roll, the video images and the post-roll to create a video recording, and causing a representation of video recording to be based upon the start frame. The method of this embodiment may also cause the pre-roll, the video images and the post-roll to be captured at the same frame rate. The method of an example embodiment may receive an indication that a video capture user input will be provided by receiving an indication that a trigger button has been partially actuated. In this embodiment, the method may also include receiving the video capture user input in response to complete actuation of the trigger button.

In another example embodiment, an apparatus is provided that includes at least one processor and at least one memory including computer program code with at the least one memory and the computer program code configured to, with the at least one processor, cause the apparatus at least to receive an indication that a video capture user input will be provided directing that video images be captured. The indication is received in advance of the video capture user input. The at least one memory and the computer program code are also configured to, with at least one processor, cause the apparatus of this embodiment to determine whether a pre-roll comprising one or more videos frames is to be captured in advance of the video capture user input in response to receiving the indication. The at least one memory and the computer program code are configured to, with at least one processor, cause the apparatus of this embodiment to cause the video images to be captured in response to the video capture user input. The video images include a start frame captured temporally proximate receipt of the video capture user input. The at least one memory and the computer program code are also configured to, with at least one processor, cause the apparatus of this embodiment to receive a video capture completion user input indicating that the capturing of the video image should be ceased. In response to receipt of the video capture completion user input, the at least one memory and the computer program code are configured to, with at least one processor, cause the apparatus of this embodiment to cause a post-roll comprising a plurality of frames to be captured following capture of the video images.

The at least one memory and the computer program code may be configured to, with at least one processor, cause the apparatus of an example embodiment to cause the video images to be captured by causing the start frame to be captured instantaneously with or near instantaneously with receipt of the video capture user input. The at least one memory and the computer program code may also be configured to, with the at least one processor, cause the apparatus of an example embodiment to determine whether a pre-roll is to be captured by causing the pre-roll to be captured only in an instance in which the frame rate is at least as great as a predefined minimum threshold. In this embodiment, the at least one memory and the computer program code may be further configured to, with the at least one processor, cause the apparatus to append the pre-roll, the video images and the post-roll to create a video recording and to cause a representation of the video recording to be based upon the start frame. In this embodiment, the at least one memory and the computer program code may also be configured to, with the at least one processor, cause the apparatus to cause the pre-roll, the video images and the post-roll to be captured by causing the pre-roll, the video images and the post-roll to be captured at the same frame rate. The at least one memory and the computer program code may be configured to, with the at least one processor, cause the apparatus of an example embodiment to receive an indication that a video capture user input will be provided by receiving an indication that a trigger button has been partially actuated. In this embodiment, the at least one memory and the computer program code may be further configured to, with at least one processor, cause the apparatus to receive the video capture user input in response to complete actuation of the trigger button.

In a further example embodiment, a computer program product is provided that includes at least one non-transitory computer-readable storage medium having computer-executable program code portions stored therein with the computer-executable program code portions including program code instructions for receiving an indication that a video capture user input will be provided directing that video images be captured. The indication is received in advance of the video capture user input. The computer-executable program code portions also include program code instructions for determining whether a pre-roll comprising one or more video frames is to be captured in advance of the video capture user input in response to receiving the indication. The computer-executable program code portions of this embodiment also include program code instructions for causing the video images to be captured in response to the video capture user input. The video images include a start frame captured temporarily proximate receipt of the video capture user input. The computer-executable program code portions also include program code instructions for receiving a video capture completion user input indicating that the capturing of the video images should be ceased. The computer-executable program code portions of this embodiment also include program code instructions for causing, in response to receipt of the video capture completion user input, a post-roll comprising a plurality of video frames to be captured following capturing video images.

The program code instructions for causing the video images to be captured may include, in one embodiment, program code instructions for causing the start frame to be captured instantaneously with or near instantaneously with the receipt of the video capture user input. The program code instructions for determining whether a pre-roll is to be captured may include, in one embodiment, program code instructions for causing the pre-roll to be captured only in an instance in which the frame rate is at least as great as a predefined minimum threshold. In this embodiment, the computer-executable program code portions may further include program code instructions for appending the pre-roll, the video images and the post-roll to create a video recording and causing a representation of the video recording to be based upon the start frame. The program code instructions for receiving an indication that a video capture user input will be provided may include, in one embodiment, program code instructions for receiving an indication that a trigger button has been partially actuated. In this embodiment, the computer-executable program code instructions may also include program code instructions for receiving the video capture user input in response to complete actuation of the trigger button.

In yet another example embodiment, an apparatus is provided that includes means for receiving an indication that a video capture user input will be provided directing that video images be captured. The indication is received in advance of the video capture user input. The apparatus of this embodiment also includes means for determining whether a pre-roll comprising one or more video frames is to be captured in advance of the video capture user input in response to receiving the indication. The apparatus of this embodiment also includes means for causing the video images to be captured in response to the video capture user input. The video images include a start frame captured temporarily proximate receipt of the video capture user input. In this embodiment, the apparatus also includes means for receiving a video capture completion user input indicating that the capturing of the video images should be ceased. In response to receipt of the video capture completion user input, the apparatus of this embodiment also includes means for causing a post-roll comprising a plurality of video frames to be captured following capture of the video images.

BRIEF DESCRIPTION OF THE DRAWINGS

Figure 1A:
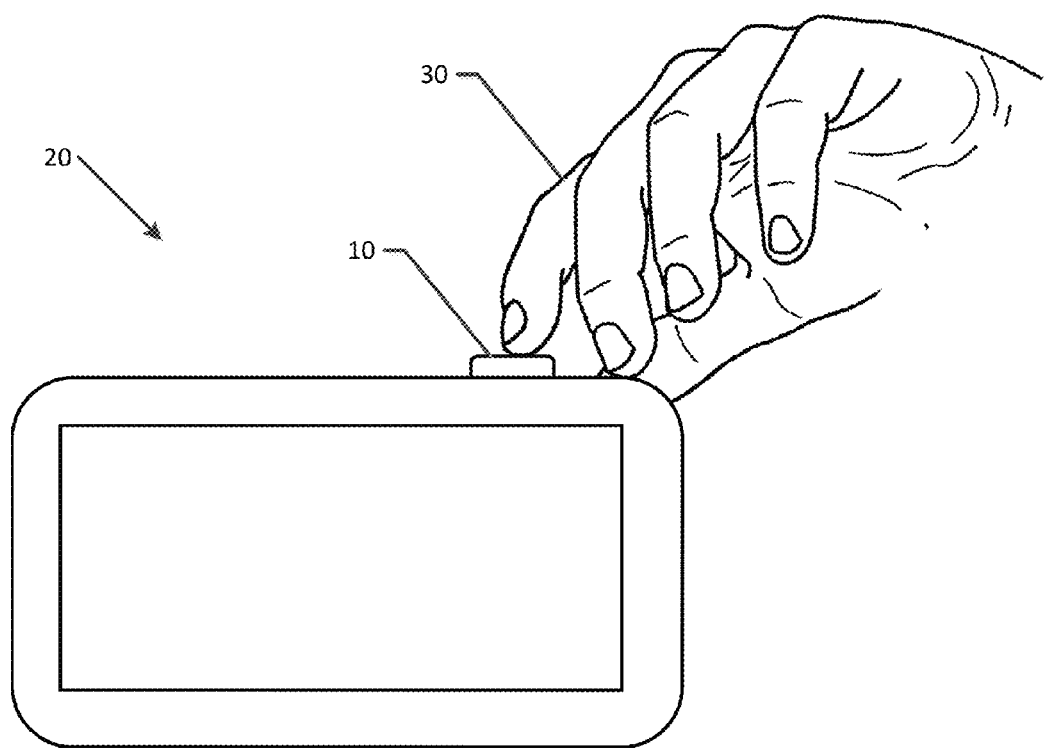
Figure 1B:
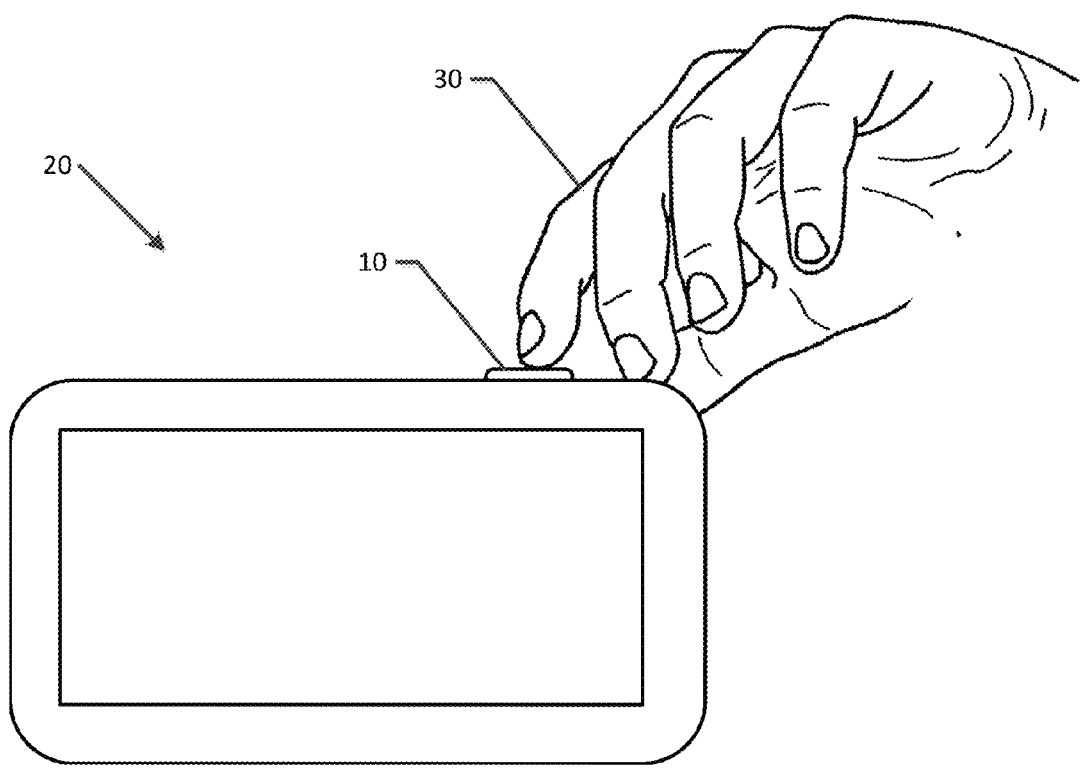
Figure 1C:
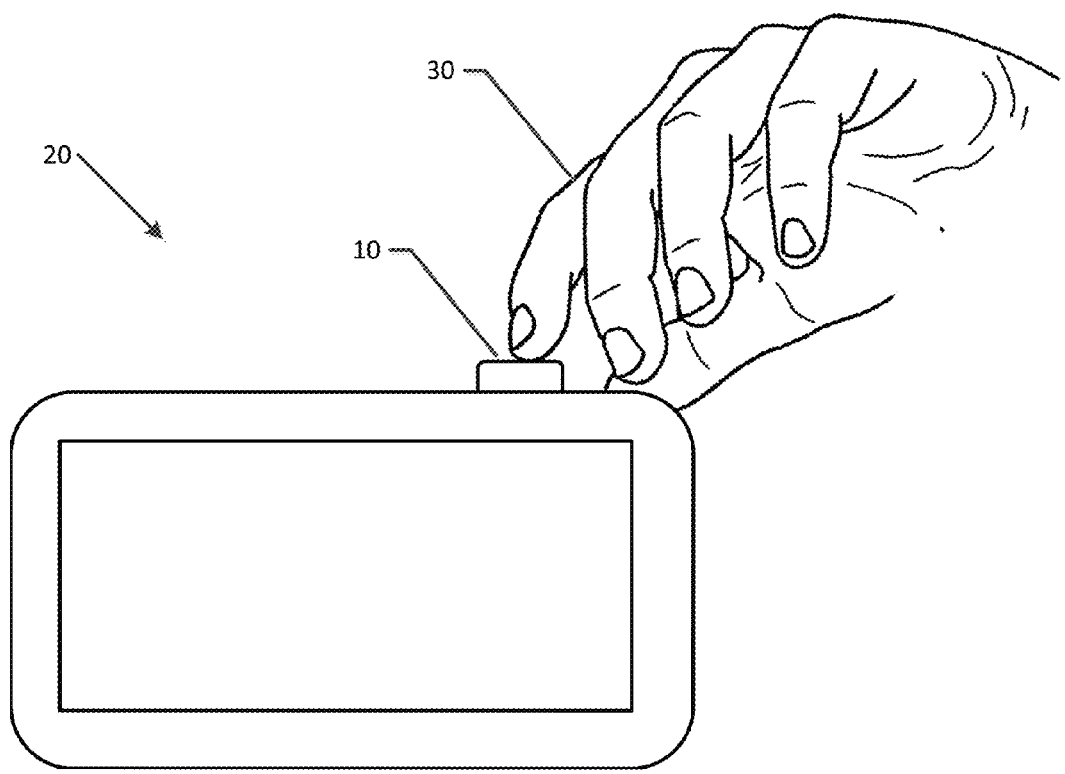
Figure 2:
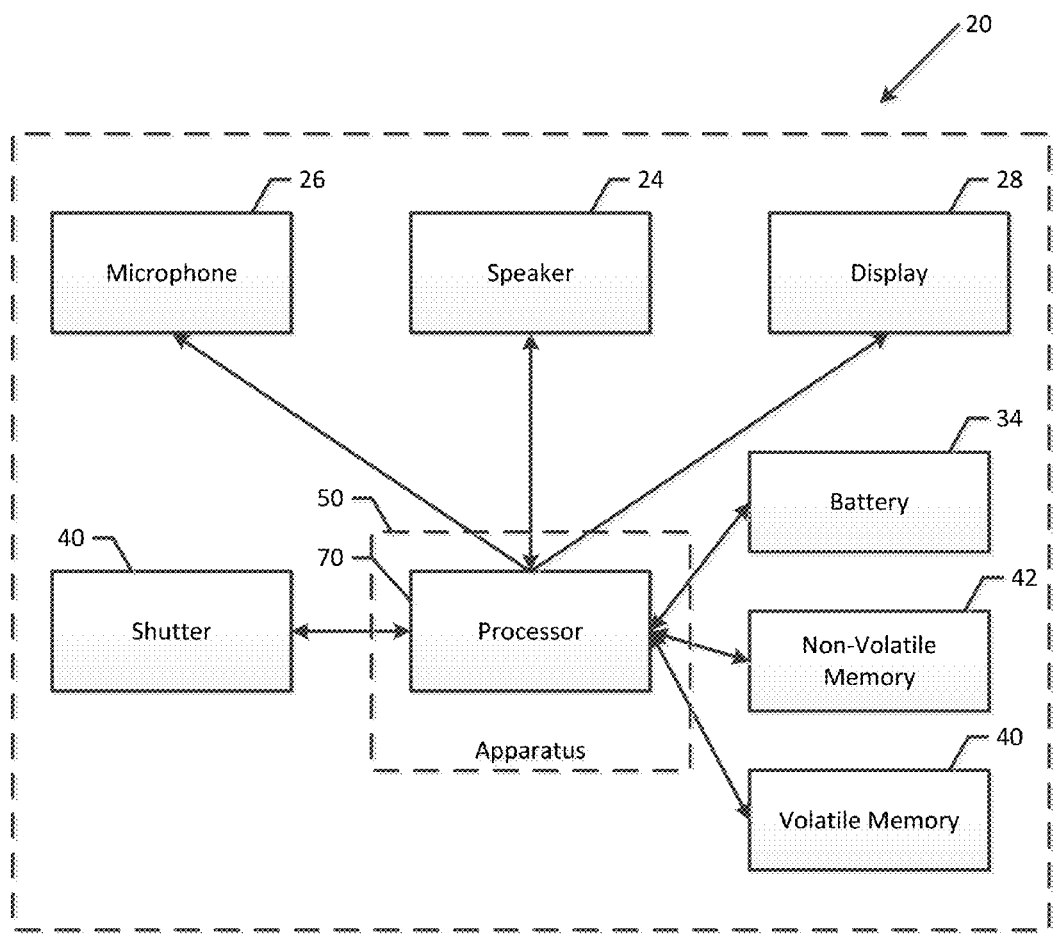
Figure 3:
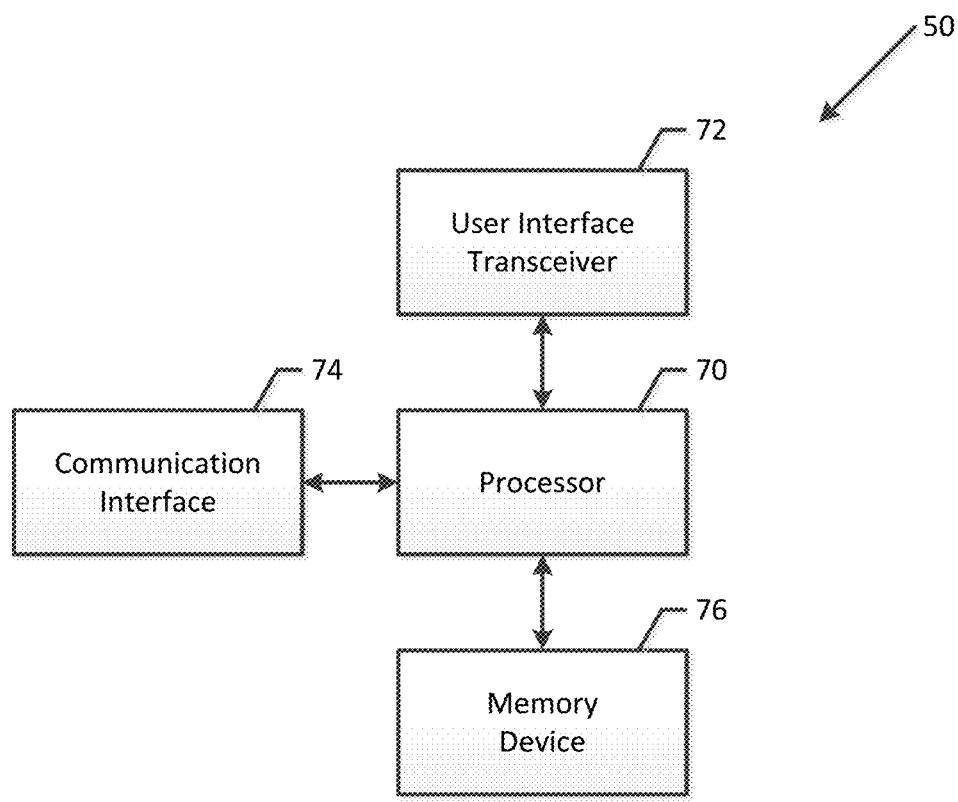
Figure 4:
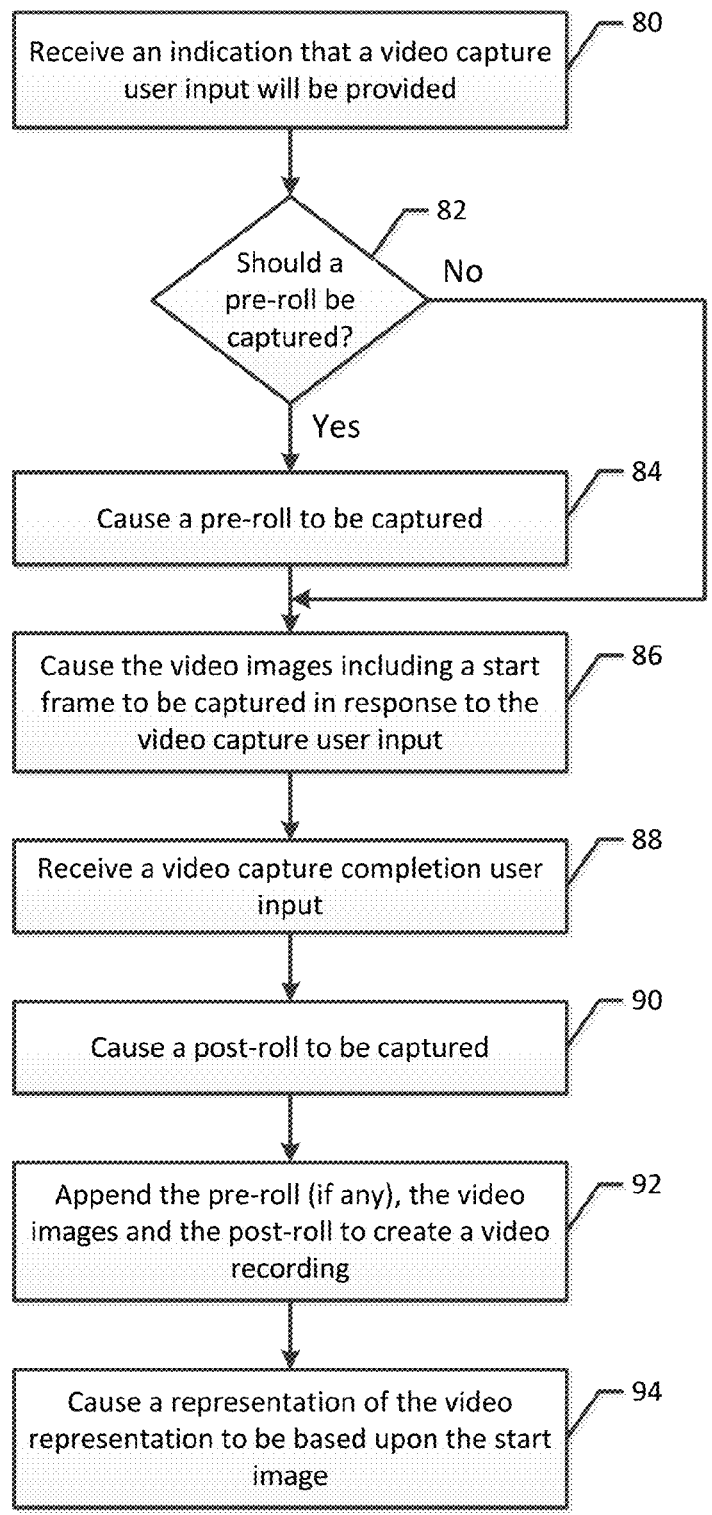

Having thus described example embodiments of the invention in general terms, reference will now be made to the accompanying drawings, which are not necessarily drawn to scale, and wherein:

FIGS. 1A, 1B and 1C illustrate the partial actuation of a trigger button, the complete actuation of the trigger button and the release of the trigger button of an image capturing device in accordance with an example embodiment of the present invention;

FIG. 2 is a block diagram of an image capturing system in accordance with an example embodiment of the present invention;

FIG. 3 is a block diagram of an apparatus that may be specifically configured in order to capture video images including a start frame in accordance with an example embodiment of the present invention; and FIG. 4 is a flow chart illustrating operations performed, such as by the apparatus of FIG. 3, in accordance with an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

A method, apparatus and computer program product are provided in accordance with an example embodiment in order to capture video images while concurrently ensuring that a start frame, also known as a focus frame, of a moment of particular interest is captured. In this regard, the method, apparatus and computer program product may be embodied in such a manner that all of the images, such as the video images and the start image, are captured by the same image capturing device, such as a video recorder or a mobile terminal having video recording functionality. The method, apparatus and computer program product of an example embodiment may provide for capture of the video images as well as the start frame of the moment of particular interest in an intuitive manner and without extensive user controls, such as based upon actuation of a trigger button such that the user need not switch between modes so as to capture a video and to capture a still image.

Indeed, in an example embodiment of the present invention, the method, apparatus and computer program product are configured to respond to the partial actuation of a trigger button, as well as to the complete or full actuation of the trigger button. In this regard, the term "actuation" as used herein refers to the user's pressing of the button. FIG. 1A, for example, shows the trigger button 10 of an image capturing device 20 being partially actuated by the user's finger 30. In this regard, the trigger button is partially actuated by being pressed inward (relative to the image capturing device) relative to its rest or unactuated position, but not being fully actuated. For example, the partial actuation of the trigger button may be defined to be the actuation of the trigger button that is at least a predetermined percent, e.g., 50%, of the full actuation of the trigger button. Additionally, FIG. 1B illustrates a user fully actuating the trigger button of the image capturing device via the user's finger. As described below, both the partial actuation of FIG. 1A and the full actuation of FIG. 1B may move the respective image capturing device from a closed shutter position to an open shutter position. Subsequently removing force from the trigger button may, in one embodiment, move the respective image capturing device from the open shutter position to the closed shutter position as shown in FIG. 1C and is referenced herein as ceasing the actuation of the button.

Turning now to FIG. 2, which provides one example embodiment, a block diagram of an image capturing device 20 that would benefit from an example embodiment of the present invention is illustrated. The image capturing device may be any device that is or includes a camera or other media capturing element configured to capture video of objects, people, and places proximate to the user of the image capturing device. It should be understood, however, that the image capturing device as illustrated and hereinafter described is merely illustrative of one type of device that may benefit from embodiments of the present invention and, therefore, should not be taken to limit the scope of embodiments of the present invention. For example, in some embodiments the image capturing device may be a stand-alone device, or a device configured for the primary purpose of capturing video images, such as a camera or video recorder, whereas in on other embodiments the image capturing device may be a component or feature of another device, such as a mobile terminal, e.g., a portable digital assistant (PDA), mobile telephone, smartphone pager, mobile television, gaming device, laptop computer, tablet computer, touch surface, wearable device, or any combination of the aforementioned, and other types of voice and text communications systems.

Referring again to FIG. 2, the image capturing device 20 may include an apparatus 50, such as or including a processor 70 or other processing device, which controls the functions of one or more components of the image capturing device. The apparatus, including a processor, is shown in FIG. 3. For example, among other functions, the apparatus (e.g., via the processor) may control the opening and closing of a shutter 40 of the image capturing device so as to direct the starting and stopping of a video recording. In some embodiments, the processor may control other aspects of the capture of video images, such as zooming, rotation, panning, fading, or other visual effects or manipulations that may be performed on the image prior to, during, or subsequent to the capture of the images.

With reference to FIGS. 2 and 3, in some embodiments, the processor 70 may include circuitry desirable for implementing audio and logic functions of the image capturing device 20. For example, the processor may be comprised of a digital signal processor device, a microprocessor device, and various analog to digital converters, digital to analog converters, and other support circuits. Control and signal processing functions of the image capturing device are allocated between these devices according to their respective capabilities. The processor may include functionality to operate one or more software programs, which may be stored in memory.

The image capturing device 20 may also comprise a user interface including an output device such as a conventional earphone or speaker 24, a microphone 26, a display 28, and a user input interface, all of which are coupled to the processor 70. The user input interface, which allows the image capturing device to receive data, may include any of a number of devices allowing the image capturing device to receive data, such as a keypad, a touch screen display (display providing an example of such a touch screen display), a trigger button 10, or other input device. In embodiments including a keypad, the keypad may include the conventional numeric (0-9) and related keys (#, *), and other hard and soft keys used for operating the image capturing device 20. Alternatively or additionally, the keypad may include a conventional QWERTY keypad arrangement. The keypad may also include various soft keys with associated functions. In addition, or alternatively, the image capturing device may include an interface device such as a joystick or other user input interface. The image capturing device may further include a battery 34, such as a vibrating battery pack, for powering various circuits that are required to operate the image capturing device.

The image capturing device 20 may further include volatile memory 40, such as volatile Random Access Memory (RAM) including a cache area for the temporary storage of data. The image capturing device may also include other non-volatile memory 42, which may be embedded and/or may be removable. The memories may store any of a number of pieces of information, and data, used by the image capturing device to implement the functions of the image capturing device. Moreover, the memories may store one or more captured images, including video recordings that are captured by the image capturing device.

It should also be noted that while FIG. 2 illustrates one example of a configuration of an image capturing device 20 configured to capture images using a multi-stage trigger button, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

With reference to FIG. 3, the apparatus 50 for capturing images using a multi-stage trigger button may include or otherwise be in communication with a processor 70, a user interface transceiver 72, a communication interface 74, and a memory device 76. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor, as well as video images captured by the image capturing device 20 and/or alterations or modifications to the images provided by the user.

The apparatus 50 may, in some embodiments, be a mobile terminal with image capturing capability (e.g., a smartphone), an image capturing device (e.g., the image capturing device 20), or a fixed communication device or computing device configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 70 may be configured to execute instructions stored in the memory device 76 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or network device) adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver may include, for example, a keyboard, a mouse, a joystick, a display, a touch screen(s), touch areas, soft keys, a microphone, a speaker, or other input/output mechanisms. For example, the user interface transceiver may include a touch screen display that is configured to present a virtual trigger button for actuation by the user with the partial actuation being based upon, for example, the pressure applied to the touch screen display. In other embodiments, however, the user interface transceiver may include a physical trigger button (e.g., the trigger button 10 of FIGS. 1A and 1B) that is actuatable by the user. Alternatively or additionally, the processor may comprise user interface circuitry configured to control at least some functions of one or more user interface elements such as, for example, a speaker, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device 76, and/or the like).

Referring now to FIG. 4, the operations performed, such as by the apparatus 50 of FIG. 3, in order to capture video images that include a start frame of a moment of particular interest are described. As shown in block 80, the apparatus may include means, such as the processor 70, the user interface transceiver 72, the trigger button 10 or the like, for receiving an indication that a video capture user input will be provided. The indication may be provided in various manners, but, in one embodiment, the indication is provided based upon an action that would necessarily occur in the process of providing the video capture user input. As such, the indication of an example embodiment serves as a precursor to the video capture user input and does not involve a separate or independent input that must be performed by the user. Additionally, the indication not only is a precursor that the video capture user input will be subsequently provided, but generally occurs a predefined period of time in advance of the video capture user input, such as a fraction of a second, a second, or somewhat more than a second prior to the video capture user input. By way of an example in which the video capture user input is provided by the full depression or other actuation of a trigger button, the indication that the video capture user input will be provided may be provided in response to the partial actuation of the trigger button. As shown in FIG. 1A, for example, an indication that a video capture user input will be provided may be provided by the trigger button and received by the processor in response to the user partially depressing the trigger button, such as by depressing the trigger button by 50% of the distance of travel required for complete actuation of the trigger button.

In response to receipt of an indication that the video capture user input will be provided, the apparatus 50 may include means, such as the processor 70 or the like, for determining whether a pre-roll should be captured. See block 82 of FIG. 4. In this regard, a pre-roll comprises a plurality of video images that may be captured at a certain frame rate in advance of the capture of video images that occurs in response to the video capture user input. The video images captured as a pre-roll may be stored in memory 76. For example, the memory device may include a circular buffer in which the pre-roll is stored. In this regard, the video images that comprise the pre-roll may consist of those video images that occur within a predefined period of time, such as one second, immediately in advance of the video images that are captured in response to the video capture user input. Thus, pre-roll video images captured further in advance of the video capture user input may be discarded or overwritten in favor of the video images that immediately precede the video capture user input.

In accordance with an example embodiment, the apparatus 50, such as the processor 70 or the like, may be configured to determine whether a pre-roll should be captured by determining whether the frame rate at which the video images are to be captured (that is, the video images to be captured in response to the video capture user input) is at least as great as a predetermined frame rate. In an instance in which the frame rate at which the video images of the pre-roll are to be captured is at least as great as the predetermined frame rate, such as ten frames per second, the apparatus may include means, such as the processor or the like, for causing a pre-roll of video images to be captured as shown in block 84, such as causing the shutter 40 to be opened. However, in an instance in which the frame rate at which the video images of the pre-roll are to be captured is less that the predetermined frame rate, the apparatus, such as the processor, may not cause a pre-roll of video images to be captured in response to the indication that a video capture user input will be provided.

As described below, a start frame will be captured in response to the video capture user input that is temporally proximate the video capture user input, such that the start frame is captured at the same time or nearly the same time as the time at which the video capture user input is provided. In instances in which the frame rate of the pre-roll is relatively low, such as less than ten frames per second, the apparatus 50, such as the processor 70, may not be able to capture the start frame at a time sufficiently temporally proximate the video capture user input and, instead, the start frame may disadvantageously be captured at some time temporally displaced, e.g., delayed, from the video capture user input based upon the frame rate at which the images of the pre-roll are captured. For example, in an instance in which the last frame of the pre-roll is captured shortly before the video capture user input, the start frame of the video images captured in response to the video capture user input may not be captured the majority of the period of time between frames, e.g., up to 0.1 seconds in an instance in which the frame rate is 10 frames per second. In this example, the start frame may not be captured at the moment that is of particular interest, but may, instead, be disadvantageously delayed relative thereto. As such, in instances in which the frame rate is relatively low, such as less than the predetermined frame rate, the apparatus, such as a processor, will not cause a pre-roll of video images to be captured such that the processor is, instead, prepared to capture the start frame temporally proximate the video capture user input. However, in instances in which the frame rate is larger, such as at least as large as the predetermined frame rate, the apparatus, such as the processor, may cause a pre-roll of video images to be captured while still being prepared to capture a start frame in a manner that is temporally proximate the video capture user input since there is less delay between the capture of adjacent images due to the larger frame rate.

In response to the video capture user input, the apparatus 50 may include means, such as the processor 70 or the like, for causing the video images including a start frame to be captured, such as a result of the processor causing the shutter 40 to be opened at the prescribed frame rate. See block 86 of FIG. 4. As described above, the start frame is captured temporally proximate the video capture user input, such as by being captured instantaneously with or near instantaneously with receipt of the video capture user input. In this regard, capturing of the start frame in a manner that is near instantaneous with receipt of the video capture user input may require the capture of the start frame within a predefined period of time of the video capture user input, such as within less than 0.1 seconds of the video capture user input.

The video capture user input may be provided in various manners. In the illustrated embodiment, however, FIG. 1B depicts the provision of the video capture user input by the depression or actuation of a trigger button 10 such that the apparatus 50, such as the processor 70, will cause a start frame will be captured temporally proximate the actuation of the trigger button. As noted above, the video capture user input may be provided concurrent with a moment that the user desires to capture. Thus, the apparatus, such as the processor, may capture the start frame of the particular moment that is of import as well as video images of the period of time in which the moment of import occurs. The video images including the start frame may be stored, such as in memory 76.

As shown in block 88 of FIG. 4, the apparatus 50 may also include means, such as the processor 70, the user interface transceiver 72, the trigger button 10 or the like, for receiving a video capture completion user input. The video capture completion user input may be provided in various manners. In the illustrated embodiment, however, the video capture completion user input is provided by release or deactuation of the trigger button as shown in FIG. 1C in which the trigger button is released and allowed to fully extend outwardly. Alternatively, the trigger button may be depressed once to provide the video capture user input and then released while the apparatus continues to capture the video images. Thereafter, the trigger button may be depressed or actuated a second time in order to provide the video capture completion user input. In any regard, the receipt of the video capture completion user input completes the capturing of the video frames in response to the video capture user input.

However, the apparatus 50 may include means, such as the processor 70 or the like, for causing a post-roll of video images to be captured as shown in block 90 of FIG. 4. In this regard, the post-roll may include a plurality of video images captured at a frame rate for a predetermined period of time following the video capture completion user input. The predetermined period of time for which the post-roll is captured may be of any length, such as one second in one embodiment. The post-roll may have the same length as the pre-roll in some embodiments. Additionally, while the frame rates of the pre-roll, the video images including the start frame captured in response to the video capture user input and the post-roll may be different, the frame rates of the pre-roll, the video recording responsive to the video capture user input and the post-roll may be the same in some embodiments.

As shown in block 90, the apparatus 50 may optionally include means, such as the processor 70 or the like, for appending the pre-roll (if any), the video images captured in response to the video capture user input and the post-roll to create a video recording. Included in this video recording is the start frame which serves as the initial frame captured in response to the video capture user input. As the start frame captures a moment that may be of particular import, the start frame may serve to represent the video recording. In this regard, the apparatus of an example embodiment may include means, such as the processor, the user interface transceiver 72 or the like for causing a representation of the video representation to be based upon the start image. For example, an icon, a thumbnail or the like (hereinafter generally referenced as an icon) representative of the video recording may be presented, such as upon a display. In this example embodiment, the icon may be a representation of the start frame, such as a smaller version of the start frame. As such, a user may more readily identify the icon in the form of the start frame and, if desired, may select the icon in the form of the start frame in order to launch the video recording and to cause the video recording to be played back. The apparatus, such as the processor, of an example embodiment may also permit the user to select another frame of the video recording to serve as the icon if the start frame is not desired by the user to utilized as the icon for some reason.

A method, apparatus 50 and computer program product are therefore provided in accordance with an example embodiment in order to capture video images in such a manner that an image of a moment of particular significance is captured within the video. Consequently, both video images as well as an image of a particular moment may be captured with a single image capturing device in an intuitive manner. Thus, a user need not be burdened with multiple devices to separately capture still images and video images, and also need not switch modes of operation, such as between a mode in which a still image is captured and a mode in which video images are captured, but may still capture video images in such a manner that a respective image of the video will coincide with the moment of particular significance.

FIG. 4 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 76 of an apparatus 50 employing an example embodiment of the present invention and executed by a processor 70 in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Furthermore, in some embodiments, additional optional operations may be included. Although the operations above are shown in a certain order in FIG. 4, certain operations may be performed in any order. In addition, modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication that a main video capture user input will be provided instructing the capture of a main video comprising a plurality of video images, wherein the indication is received before receiving the main video capture user input;
   determining, with a processor, whether a pre-roll is captured in response to receiving the indication based on a frame rate of the main video to be captured, wherein the pre-roll comprises one or more video frames captured before receiving the main video capture user input;
   causing the main video to be captured in response to the main video capture user input, wherein the plurality of video images of the main video comprises a start frame captured temporally proximate to receiving of the main video capture user input;
   receiving a main video capture completion user input instructing the capture of the main video to cease; and
   in response to receiving the main video capture completion user input, causing a post-roll to be captured comprising a plurality of video frames captured following capture of the main video.

2. The method according to claim 1, wherein causing the main video to be captured comprises:
   causing the start frame to be captured instantaneously with or near instantaneously with receipt of the main video capture user input.

3. The method according to claim 1 further comprising:
   when the frame rate of the main video to be captured is at least as great as a predetermined frame rate, causing the pre-roll to be captured;
   when the frame rate of the main video to be captures is less than the predetermined frame rate, causing no pre-roll to be captured.

4. The method according to claim 3 further comprising:
   appending the pre-roll, the main video and the post-roll to create a video recording; and
   causing a representation of the video recording to be based upon the start frame.

5. The method according to claim 3, wherein causing the pre-roll, the main video and the post-roll to be captured comprises:
   causing the pre-roll, the main video and the post-roll to be captured at a same frame rate.

6. The method according to claim 1, wherein receiving the indication that the main video capture user input will be provided comprises:
   receiving an indication that a trigger button has been partially actuated.

7. The method according to claim 6, further comprising:
   receiving the main video capture user input in response to complete actuation of the trigger button.

8. An apparatus comprising:
   at least one a processor; and
   at least one memory including computer program code, the at least one memory and the computer program code configured to, with the at least one processor, cause the apparatus at least to:
     receive an indication that a main video capture user input will be provided instructing the capture of a main video comprising a plurality of video images, wherein the indication is received before receipt of the main video capture user input;
     determine whether a pre-roll is captured in response to receipt of the indication based on a frame rate of the main video to be captured, wherein the pre-roll comprises one or more video frames captured before receipt of the main video capture user input
     cause the main video to be captured in response to the main video capture user input, wherein the plurality of video images of the main video comprises a start frame captured temporally proximate to receipt of the video capture user input;
     receive a main video capture completion user input instructing the capture of the main video to cease; and
     in response to receipt of the main video capture completion user input, cause a post-roll to be captured comprising a plurality of video frames captured following capture of the main video.

9. The apparatus according to claim 8 wherein the at least one memory and the computer program code are configured to, with the at least one processor, cause the apparatus to:
   cause the main video to be captured by causation of the capture of the start frame instantaneously with or near instantaneously with receipt of the main video capture user input.

10. The apparatus according to claim 8 wherein the at least one memory and the computer program code are configured to, with the at least one processor, cause the apparatus to:
    when the frame rate of the main video to be captured is at least as great as a predetermined frame rate, causation of the pre-roll to be captured;
    when the frame rate of the main video to be captures is less than the predetermined frame rate, causation of pre-roll to not be captured.

11. The apparatus according to claim 10, wherein the at least one memory and the computer program code are further configured to, with the at least one processor, cause the apparatus to:
    append the pre-roll, the main video and the post-roll to create a video recording; and
    cause a representation of the video recording to be based upon the start frame.

12. The apparatus according to claim 10, wherein the at least one memory and the computer program code are configured to, with the at least one processor, cause the apparatus to:
    cause the pre-roll, the main video and the post-roll to be captured at a same frame rate.

13. The apparatus according to claim 8, wherein the at least one memory and the computer program code are configured to, with the at least one processor, cause the apparatus to:
receive the indication that the main video capture user input will be provided by receipt of an indication that a trigger button has been partially actuated.

14. The apparatus according to claim 13 wherein the at least one memory and the computer program code are further configured to, with the at least one processor, cause the apparatus to:
receive the main video capture user input in response to complete actuation of the trigger button.

15. A computer program product comprising at least one non-transitory computer-readable storage medium having computer-executable program code portions stored therein, the computer-executable program code portions comprising program code instructions for:
receiving an indication that a main video capture user input will be provided instructing the capture of a main video comprising a plurality of video images, wherein the indication is received before receiving the main video capture user input;
determining, with a processor, whether a pre-roll is captured in response to receiving the indication based on a frame rate of the main video to be captured, wherein the pre-roll comprises one or more video frames captured before receiving the main video capture user input;
causing the main video to be captured in response to the main video capture user input, wherein the plurality of video images of the main video comprises a start frame captured temporally proximate to receiving of the main video capture user input;
receiving a main video capture completion user input instructing the capture of the main video to cease; and
in response to receiving the main video capture completion user input, causing a post-roll to be captured comprising a plurality of video frames captured following capture of the main video.

16. The computer program product according to claim 15, wherein the program code instructions for causing the video images to be captured comprise program code instructions for:
causing the start frame to be captured instantaneously with or near instantaneously with receipt of the main video capture user input.

17. The computer program product according to claim 15, wherein the computer-executable program code instructions further comprise:
when the frame rate of the main video to be captured is at least as great as a predetermined frame rate, causing the pre-roll to be captured;
when the frame rate of the main video to be captures is less than the predetermined frame rate, causing no pre-roll to be captured.

18. The computer program product according to claim 17, wherein the computer-executable program code portions further comprise program code instructions for:
appending the pre-roll, the main video and the post-roll to create a video recording; and
causing a representation of the video recording to be based upon the start frame.

19. The computer program product according to claim 15 wherein the program code instructions for receiving the indication that the video capture user input will be provided comprise program code instructions for:
receiving an indication that a trigger button has been partially actuated.

20. The computer program product according to claim 19, wherein the computer-executable program code portions further comprise program code instructions for
receiving the main video capture user input in response to complete actuation of the trigger button.

* * * * *